US012609586B2

(12) United States Patent
Marotzke

(10) Patent No.: US 12,609,586 B2
(45) Date of Patent: Apr. 21, 2026

(54) COOLING FLUID CONDUCTING DEVICE FOR AN ELECTRIC MACHINE, ELECTRIC MACHINE, AND METHOD FOR PROVIDING AN ELECTRIC MACHINE

(71) Applicant: Bayerische Motoren Werke Aktiengesellschaft, Munich (DE)

(72) Inventor: Robin Marotzke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 187 days.

(21) Appl. No.: 18/565,125

(22) PCT Filed: Jul. 12, 2022

(86) PCT No.: PCT/EP2022/069397
§ 371 (c)(1),
(2) Date: Nov. 29, 2023

(87) PCT Pub. No.: WO2023/011868
PCT Pub. Date: Feb. 9, 2023

(65) Prior Publication Data
US 2024/0266919 A1      Aug. 8, 2024

(30) Foreign Application Priority Data

Aug. 2, 2021     (DE) ..................... 10 2021 119 990.5

(51) Int. Cl.
*H02K 9/19*         (2006.01)
*H02K 9/06*         (2006.01)
*H02K 15/00*        (2025.01)
(52) U.S. Cl.
CPC ................. *H02K 9/19* (2013.01); *H02K 9/06* (2013.01); *H02K 15/00* (2013.01)

(58) Field of Classification Search
CPC ................................... H02K 1/20; H02K 1/32
(Continued)

(56) References Cited

U.S. PATENT DOCUMENTS 6,215,212 B1 *   4/2001   Grennan ................... H02K 1/32
                                                                        310/58
2012/0299404 A1    11/2012  Yamamoto et al.
(Continued)

FOREIGN PATENT DOCUMENTS

CN              111969791 A      11/2020
DE      10 2008 020 426 A1      10/2009
(Continued)

OTHER PUBLICATIONS

Machine translation of 6,215,212 (Year: 2019).*
(Continued)

*Primary Examiner* — Oluseye Iwarere
*Assistant Examiner* — Minki Chang
(74) *Attorney, Agent, or Firm* — Crowell & Moring LLP

(57)                    ABSTRACT
A cooling fluid conducting device for an electric machine has multiple cooling fluid lines which protrude outwards radially from a central axis of the cooling fluid conducting device on a common circular surface. Each cooling fluid line has an inlet opening which is designed to be arranged so as to be flush with a paired bore of a rotor shaft, whereby a cooling fluid can flow from the rotor shaft into the respective cooling fluid line via the inlet opening. Each cooling fluid line has at least one outlet opening which is designed to be arranged so as to face a stator or a rotor of the electric machine and via which the cooling fluid can flow out of the respective cooling fluid line and from the cooling fluid conducting device to the stator and/or the rotor.

10 Claims, 1 Drawing Sheet

(58) Field of Classification Search
USPC ................................................. 310/52–60 A
See application file for complete search history.

(56) References Cited

U.S. PATENT DOCUMENTS

| | | | |
|---|---|---|---|
| 2018/0069455 | A1 | 3/2018 | Engblom |
| 2019/0312475 | A1 | 10/2019 | Seidl |

FOREIGN PATENT DOCUMENTS

| | | | | |
|---|---|---|---|---|
| DE | 10 2013 020 324 | A1 | 7/2014 | |
| DE | 10 2016 216 088 | A1 | 3/2018 | |
| DE | 10 2016 208 770 | B4 | 10/2018 | |
| DE | 10 2018 215 734 | A1 | 3/2020 | |
| GB | 170 946 | A | 10/1921 | |
| GB | 1 514 087 | A | 6/1978 | |
| JP | 2019193452 | A * | 10/2019 | |
| WO | WO-2021136819 | A1 * | 7/2021 | ............. H02K 9/197 |

OTHER PUBLICATIONS

WO-2021136819-A1 machine translation (Year: 2021).*
International Search Report (PCT/ISA/210) issued in PCT Application No. PCT/EP2022/069397 dated Nov. 11, 2022 with English translation (5 pages).
German-language Written Opinion (PCT/ISA/237) issued in PCT Application No. PCT/EP2022/069397 dated Nov. 11, 2022 with English translation (8 pages).
German Search Report issued in German Application No. 10 2021 119 990.5 dated Apr. 13, 2022 with partial English translation (11 pages).

* cited by examiner

1

COOLING FLUID CONDUCTING DEVICE FOR AN ELECTRIC MACHINE, ELECTRIC MACHINE, AND METHOD FOR PROVIDING AN ELECTRIC MACHINE

BACKGROUND AND SUMMARY

The invention relates to a cooling-fluid-conducting device for an electric machine, to an electric machine, and to a method for providing an electric machine.

An electric machine having a rotor shaft in the form of a hollow shaft is known from DE 10 2016 216 088 A1. The rotor shaft has an axial bore which runs in an axial direction and which extends approximately as far as halfway through the rotor shaft and which then transitions into multiple radial bores, said multiple radial bores being distributed around the circumference of the rotor shaft and connecting the axial bore to an outer lateral surface of the rotor shaft and opening out into radial cooling-channel sections of a rotor laminated core. During rotation of the rotor shaft, a cooling medium situated within the axial bore of the rotor shaft is conveyed through the axial bore and is conducted out of the radial bores into the radial cooling-channel sections of the rotor laminated core. From there, the cooling medium flows through the axial cooling-channel sections of the rotor laminated core as far as the end faces thereof, from where the cooling medium is thrown in the direction of stator winding heads. The cooling medium, upon impingement on the stator winding heads, cools the latter and subsequently drips into a sump of a housing section of the electric machine.

It is an object of the present invention to provide a solution which makes it possible for a cooling fluid to be conducted with precision through an electric machine and for the electric machine to be cooled particularly uniformly by means of the cooling fluid.

This object is achieved by the subject matter of the independent claims. Further possible configurations of the invention are disclosed in the dependent claims, the description and the figures.

The invention relates to a cooling-fluid-conducting device for an electric machine. The cooling-fluid-conducting device is configured in particular for being held in a rotationally conjoint manner on a hollow rotor shaft of the electric machine. For this purpose, the cooling-fluid-conducting device can be plugged onto said rotor shaft. The cooling-fluid-conducting device comprises multiple cooling-fluid lines which project radially outward from a center axis of the cooling-fluid-conducting device on a common circular surface. Each cooling-fluid line has an inlet opening which is configured to be arranged in a manner aligned with an assigned bore of the rotor shaft of the electric machine, whereby a cooling fluid can flow into the respective cooling-fluid line from the rotor shaft via the inlet opening.

Furthermore, it is provided that each cooling-fluid line has at least one outlet opening which is configured to be arranged facing toward a stator or a rotor of the electric machine. Via this respective outlet opening, the cooling fluid can flow out of the respective cooling-fluid line from the cooling-fluid-conducting device to the stator and/or to the rotor. The cooling-fluid lines thus project in a star-shaped manner from the center axis of the cooling-fluid-conducting device, whereby, in the fitting position of the cooling-fluid-conducting device on the hollow rotor shaft of the electric machine, the cooling fluid can be transported from the rotor shaft to the stator and/or to the rotor, which encloses the rotor shaft at the outer circumferential side, by means of the cooling-fluid lines. Via the respective outlet openings of the cooling-fluid lines, it is possible for exiting of the cooling fluid from the respective cooling-fluid lines to be specified particularly precisely and for the rotor and/or the stator to be flowed against by the cooling fluid with pinpoint accuracy. In this way, the rotor and/or the stator of the electric machine can be cooled in a positionally accurate manner and according to requirements. Through the assignment of the respective inlet openings of the cooling-fluid lines to the bores of the rotor shaft, reliable and in particular loss-free inflow of cooling fluid from the hollow rotor shaft into the respective cooling-fluid lines can be ensured.

In a further configuration of the invention, it is provided that respective inner ends of the cooling-fluid lines are connected to one another via an inner ring and/or respective outer ends of the cooling-fluid lines are connected to one another via an outer ring. The cooling-fluid-conducting device can thus be designed as a kind of wheel in which the cooling-fluid lines represent respective spokes of said wheel. The respective cooling-fluid lines can be fixed in terms of their orientation and in terms of their position with respect to one another via the inner ring and/or via the outer ring. Furthermore, the inner ring and/or the outer ring allow particularly effective stabilization of the cooling-fluid-conducting device with particularly low weight of the cooling-fluid-conducting device.

In a further configuration of the invention, it is provided that the cooling-fluid lines have at the outer side an air-conducting geometry which is configured to conduct air to the rotor and/or to the stator. In addition to the introduction of the cooling fluid to the rotor and/or to the stator via the cooling-fluid lines, it is thus possible for air to be introduced into the rotor and/or into the stator in that, during rotation of the cooling-fluid-conducting device, the air-conducting geometry of the cooling-fluid-conducting device conveys air to the rotor and/or to the stator. The air conducted to the stator and/or to the rotor can perform an additional cooling function for the electric machine, on the one hand, and/or bring about atomization of the cooling fluid exiting the cooling-fluid lines via the outlet openings, on the other hand, whereby particularly uniform spraying of an end face of the rotor and/or of the stator with the cooling fluid can be made possible. In this way, particularly efficient and uniform cooling of the electric machine can be achieved by the cooling-fluid-conducting device.

In this context, it may be provided in particular that the air-conducting geometry is configured to have a blade form. These blades of the air-conducting geometry are shaped and oriented in particular in such a way that, during a rotational movement of the cooling-fluid-conducting device, they are flowed around in an oblique or asymmetrical manner by the surrounding medium, for example air or water. As a result of the blade form of the air-guiding geometry, the cooling-fluid-conducting device can be formed in particular into a kind of propeller or be configured to have a propeller form. The blade form of the air-guiding geometry allows the medium surrounding the air-guiding geometry, in the present case air, to be conveyed particularly efficiently to the rotor and/or to the stator.

In a further configuration of the invention, it is provided that the at least one outlet opening is provided by a nozzle. The provision of the at least one outlet opening by means of the nozzle allows an outflow speed and an outflow direction of the cooling fluid from the respective cooling-fluid line to be set particularly easily and precisely. Furthermore, the provision of the at least one outlet opening by the nozzle allows a swirl to be imparted to the cooling fluid flowing out of the respective cooling-fluid line. In this way, respective flow properties of the cooling fluid can be influenced in a targeted manner so as to allow particularly effective heat transfer from the rotor and/or the stator to the cooling fluid and thus particularly good cooling action of the cooling fluid.

In a further configuration of the invention, it is provided that the at least one outlet opening assigned to the stator is delimited radially toward the center axis by a guide nose which is configured to guide cooling fluid flowing out via this outlet opening. Thus, by means of the guide nose, it is possible to at least substantially avoid a situation in which the cooling fluid exiting the outlet opening directly enters a gap between the rotor and the stator of the electric machine and thereby flows through the electric machine while bypassing the stator. Rather, the guide nose serves to ensure that the cooling fluid exiting the outlet opening and intended for the stator reliably flows into the stator.

The invention furthermore relates to an electric machine having a cooling-fluid-conducting device as has already been described in connection with the cooling-fluid-conducting device according to the invention. The electric machine furthermore comprises a hollow rotor shaft on which the cooling-fluid-conducting device is held in a rotationally conjoint manner. In particular, the cooling-fluid-conducting device is plugged onto the hollow rotor shaft. The cooling-fluid-conducting device can thereby completely enclose the rotor shaft at the outer circumferential side over a length section. The electric machine furthermore comprises a rotor, which is held in a rotationally conjoint manner on the rotor shaft, and a stator, relative to which the rotor can be rotated about a center axis. The cooling-fluid-conducting device is thus also arranged in a rotationally conjoint manner with respect to the rotor. Thus, cooling fluid exiting the cooling-fluid-conducting device from respective cooling-fluid lines via at least one outlet opening and assigned to the rotor flows against defined, assigned, specified positions of the rotor, which are thus able to be cooled particularly effectively by means of the cooling fluid. Within the electric machine, by way of the cooling-fluid-conducting device, the cooling fluid can be guided particularly precisely, whereby the rotor and the stator of the electric machine can be cooled particularly efficiently by means of the cooling fluid. Advantages and advantageous refinements of the cooling-fluid-conducting device according to the invention are to be regarded as advantages and advantageous refinements of the electric machine according to the invention and vice versa.

In a further configuration of the invention, it is provided that the hollow rotor shaft has for each cooling-fluid line a bore which is arranged so as to be aligned with the inlet opening of the respective assigned cooling-fluid line. The respective aligned bores of the rotor shaft with the inlet openings of the respective assigned cooling-fluid lines allow the cooling fluid to flow particularly reliably from the hollow rotor shaft into the respective cooling-fluid lines. Flowing-past of the cooling fluid in the respective cooling-fluid lines can thus be avoided particularly effectively.

In a further configuration of the invention, it is provided that at least one cooling-fluid line has an outlet opening which is aligned with an interspace between two adjacent legs of the rotor. The cooling fluid flowing out of the cooling-fluid line via this outlet opening can thus be conducted particularly precisely into the interspace between the adjacent legs of the rotor, whereby windings of the rotor can be cooled particularly effectively and efficiently. In this way, particularly efficient cooling of the rotor and consequently particularly high performance of the rotor can be achieved.

The invention furthermore relates to a method for providing such an electric machine. In the method, it is provided that the cooling-fluid-conducting device is fastened in a rotationally conjoint manner to the hollow rotor shaft. It is furthermore provided that the rotor shaft is set in rotation about the center axis by the rotor. The rotor shaft is subsequently balanced by way of removal of material and/or application of material at the cooling-fluid-conducting device. The cooling-fluid-conducting device thus serves for compensating for imbalances of a rotor device, comprising the rotor shaft and the rotor, of the electric machine. It is thus possible for particularly uniform running of the electric machine to be brought about by compensation of imbalances. In this way, a particularly long service life of the electric machine can be achieved.

Advantages and advantageous refinements of the cooling-fluid-conducting device according to the invention and of the electric machine according to the invention are to be regarded as advantages and advantageous refinements of the method according to the invention and vice versa.

Further features of the invention may emerge from the claims, the figures and the description of the figures. The features and feature combinations mentioned above in the description and the features and feature combinations presented below in the description of the figures and/or shown in the figures alone may be used not only in the respectively specified combination but also in other combinations or individually without departing from the scope of the invention.

BRIEF DESCRIPTION OF THE DRAWINGS

In the figures, identical and functionally identical elements are denoted by the same reference signs.

DETAILED DESCRIPTION OF THE DRAWINGS

Figure 1:
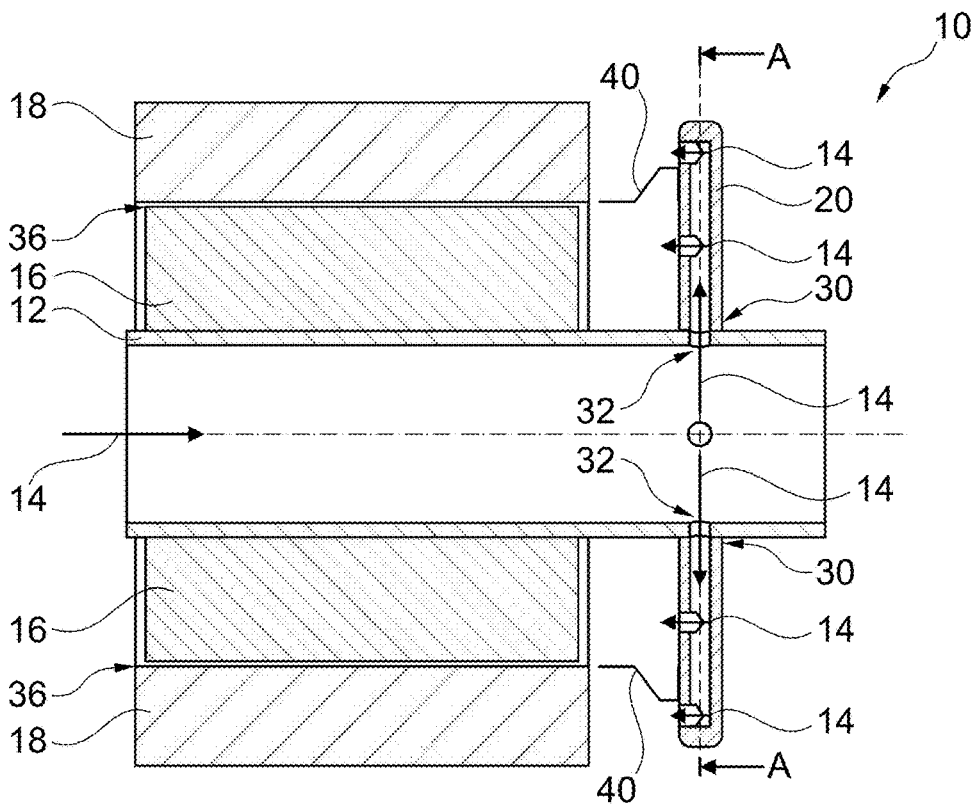
FIG. 1 is a schematic longitudinal view of an electric machine with a cooling-fluid-conducting device which is plugged on a rotor shaft and which is configured to conduct to a rotor and/or to a stator of the electric machine cooling fluid exiting the hollow rotor shaft, and with the rotor and the stator.
Figure 2:
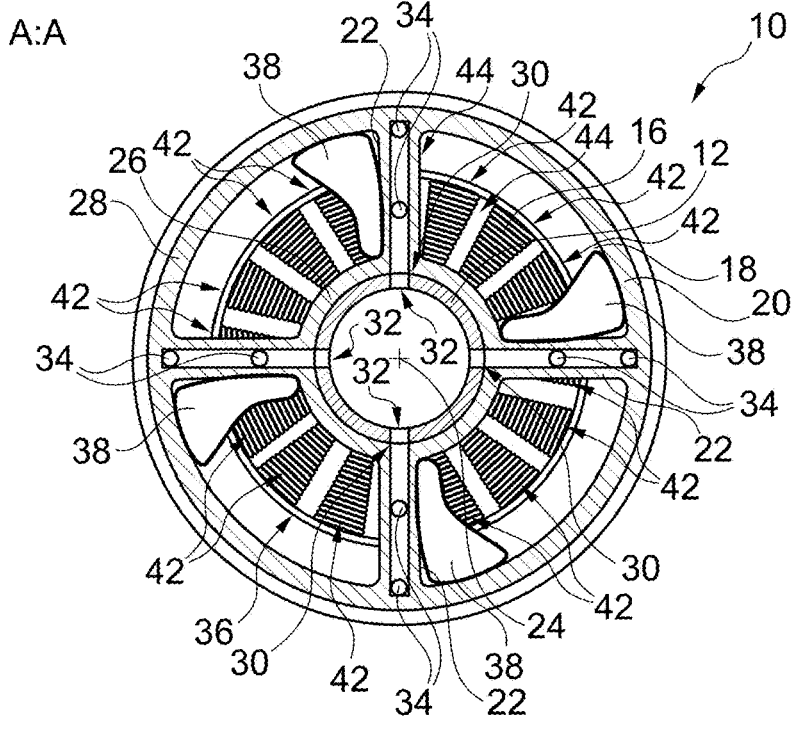
FIG. 2 is a schematic cross-sectional view of the electric machine through the cooling-fluid-conducting device, wherein it can be seen that the cooling-fluid-conducting device has four cooling-fluid lines, which in each case are fluidically connected to the hollow shaft and project in a radial manner from a center axis of the cooling-fluid-conducting device, wherein the center axis of the cooling-fluid-conducting device coincides with a center axis of the hollow rotor shaft or with an axis of rotation of the hollow rotor shaft.

FIGS. 1 and 2 each show, in different sectional illustrations, an electric machine 10, in particular for a motor vehicle. The electric machine 10 is illustrated in a longitudinal section in FIG. 1 and is illustrated in a cross section along the section line A-A shown in FIG. 1 in FIG. 2. The electric machine 10 comprises a hollow rotor shaft 12 which is configured to be flowed through by a cooling fluid 14. A flow direction of the cooling fluid 14 is indicated by respective arrows in FIG. 1.

The electric machine 10 furthermore comprises a rotor 16, which is held in a rotationally conjoint manner on the hollow rotor shaft 12, and a stator 18. The rotor 16 completely encloses the rotor shaft 12 at the outer circumferential side over a length section of the rotor shaft 12. Both the rotor 16 and the stator 18 may comprise at least one laminated core, around which respective windings are looped.

In order to be able to particularly reliably and precisely guide to the rotor 16 and to the stator 18 the cooling fluid 14 flowing in the hollow rotor shaft 12, it is provided that the electric machine 10 comprises a cooling-fluid-conducting device 20. The cooling-fluid-conducting device 20 is, in the present case, plugged onto the hollow rotor shaft 12 and held in a rotationally conjoint manner on the rotor shaft 12. As can be seen in FIG. 1, the cooling-fluid-conducting device 20 is configured to receive the cooling fluid 14 from the hollow rotor shaft 12 and, in the present case, to conduct it to the rotor 16 and to the stator 18, in particular to guide it to a respective end face of the rotor 16 and of the stator 18. Owing to the rotationally conjoint arrangement of the rotor 16 with respect to the rotor shaft 12 and of the cooling-fluid-conducting device 20 with respect to the rotor shaft 12, the cooling-fluid-conducting device 20 is also arranged in a rotationally conjoint manner with respect to the rotor 16. By means of the cooling-fluid-conducting device 20, it is thus provided in the present case that cooling fluid 14 flowing out of the cooling-fluid-conducting device 20 toward the rotor 16 is guided in an interspace 44 between two adjacent legs 42 of the rotor 16, whereby respective windings of the rotor 16 can be cooled particularly effectively.

A precise design of the cooling-fluid-conducting device 20 is described in more detail below in conjunction with FIG. 2. In the present case, the cooling-fluid-conducting device 20 comprises exactly four cooling-fluid lines 22 which project radially outward from the center axis 24 on a common circular surface and consequently extend in a star-shaped manner from the center axis 24. In the present case, the cooling-fluid lines 22 are arranged so as to be distributed uniformly over a circumference of the cooling-fluid-conducting device 20. Thus, the respective cooling-fluid lines 22 have in each case identical spacings to adjacent cooling-fluid lines 22. In the present case, respective inner ends of the cooling-fluid lines 22 are connected to one another via an inner ring 26. Respective outer ends of the cooling-fluid lines 22 are connected to one another via an outer ring 28. In this way, the cooling-fluid lines 22 are stabilized particularly effectively.

In order to allow an inflow of the cooling fluid 14 from the hollow rotor shaft 12 into the cooling-fluid-conducting device 20, it is provided that each of the cooling-fluid lines 22 has an inlet opening 30 which is arranged so as to be aligned with an assigned bore 32 of the hollow rotor shaft 12. Via the bores 32, the cooling fluid 14 can exit the rotor shaft 12, and via the respective inlet openings 30, the cooling fluid 14 can flow into the assigned cooling-fluid lines 22. In order to allow an outflow of the cooling fluid 14 from the cooling-fluid lines 22 to the rotor 16 and/or to the stator 18, the respective cooling-fluid lines 22, in the present case, have at least one outlet opening 34. In the present case, each of the cooling-fluid lines 22 has one outlet opening 34 which is assigned to the rotor 16 and has one outlet opening 34 which is assigned to the stator 18. Via the respective outlet openings 34 of the cooling-fluid lines 22 that are assigned to the rotor 16, the cooling fluid 14 can flow out of the respective cooling-fluid line 22 toward the rotor 16. Via the respective outlet openings 34 that are assigned to the stator 18, the cooling fluid 14 guided in the cooling-fluid lines 22 can flow out of the respective cooling-fluid lines 22 and flow against the stator 18 or flow into the stator 18.

In order to keep a gap 36 between the rotor 16 and the stator 18 free of cooling fluid 14, provision may be made of a guide nose 38 at that outlet opening 34 of the respective cooling-fluid line 22 which is assigned to the stator 18, which guide nose 38 delimits the outlet opening 34 radially toward the center axis 24. This guide nose 38 is configured to guide cooling fluid 14 flowing out via the outlet opening 34. In order to set a respective distribution of the cooling fluid 14 between the rotor 16 and the stator 18, the respective outlet openings 34 may be provided by respective nozzles of the cooling-fluid-conducting device 20. By setting the respective nozzle diameters of the nozzles, a distribution of the cooling fluid 14 flowing through the cooling-fluid-conducting device 20 between the rotor 16 and the stator 18 can be realized.

In order, by means of the cooling-fluid-conducting device 20, to additionally be able to guide to the rotor 16 and/or to the stator 18 a medium surrounding the cooling-fluid-conducting device 20, in particular air, it is provided in the present case that the cooling-fluid lines 22 each have at the outer side an air-conducting geometry 40 which is configured to conduct air to the rotor 16 and/or to the stator 18. In this case, the air-conducting geometry 40 is configured in the present case to have a blade form. The blade form makes it possible for air to be guided to the rotor 16 and/or to the stator 18, for example by way of scooping of the air, during rotation of the cooling-fluid-conducting device 20. Possibly, by means of the air conveyed by the cooling-fluid-conducting device 20, the cooling fluid 14 exiting, via the outlet openings 34, the respective cooling-fluid lines 22 can be atomized, whereby the end faces of the rotor 16 and/or of the stator 18 can be wetted by a spray mist of the cooling fluid 14. In this case, complete or partial atomization of the cooling fluid 14 exiting the cooling-fluid-conducting device 20 via the outlet openings 34 is possible.

The invention described is based on the realization that cooling of rotor 16 and stator 18 of the electric machine 10 is decisive for a maximum realizable power of the electric machine 10. The electric machine 10 is in particular an electric motor, in particular a wet-running electric motor.

In the present case, the rotor 16 and the stator 18 are cooled by means of oil, as cooling fluid 14. For this purpose, the oil is introduced axially into the hollow rotor shaft 12. The oil is discharged from the rotor shaft 12 via the radial bores 32 of the rotor shaft 12 owing to centrifugal force. The oil exiting the rotor shaft 12 cools the rotor 16 and the stator 18 and then flows away into an oil pan. The cooling-fluid-conducting device 20 makes possible directed discharge of the cooling fluid 14 to the rotor 16 and to the stator 18. The cooling-fluid-conducting device 20 can, in the present case, also be referred to as an oil-spraying wheel, which is seated on the rotor shaft 12 and is configured to radially conduct, via hollow spokes, in the present case the cooling-fluid lines 22, the cooling fluid 14 radially exiting the rotor shaft 12 to the rotor 16 and to the stator 18 and, there, to spray out the cooling fluid, such that it is directed via nozzle openings, in the present case the outlet openings 34, in a radially directed manner. The oil-spraying wheel may be simultaneously used for balancing the rotor shaft 12.

Provision is made such that, during operation of the electric machine 10, the oil is introduced axially into the hollow rotor shaft 12 and, via the radial bores 32, exits the rotor shaft 12 and enters the oil-spraying wheel. The oil-spraying wheel has the multiple hollow spokes, in the present case the cooling-fluid lines 22, which are configured to transport the oil further radially as far as a desired radial distance of the rotor 16 and of the stator 18. The oil exits through axial nozzle openings in the oil-spraying wheel, in the present case the outlet openings 34, so as to be directed to the rotor 16 and to the stator 18. Owing to centrifugal force, the oil impinges on the rotor 16 and the stator 18 at a particular high flow speed and, in this way, ensures a particularly high level of heat dissipation.

Deflecting plates provided in the electric machine 10 can favorably promote drainage of the oil from a housing of the electric machine 10 into an oil pan. The cooling fluid 14 can be conveyed from the oil pan back into the hollow rotor shaft 12 again, so as to allow circulation of the cooling fluid 14. The oil-spraying wheel can be used to compensate for an imbalance of the rotor shaft 12. For this purpose, material can be removed or applied in a targeted manner at the oil-spraying wheel in a balancing process. The removal of material at the cooling-fluid-conducting device 20 may be performed in particular by formation of bores in the cooling-fluid-conducting device 20.

Overall, the invention shows how an oil-spraying wheel can be provided.

LIST OF REFERENCE SIGNS

10 Electric machine
12 Rotor shaft
14 Cooling fluid
16 Rotor
18 Stator
20 Cooling-fluid-conducting device
22 Cooling-fluid line
24 Center axis
26 Inner ring
28 Outer ring
30 Inlet opening
32 Bore
34 Outlet opening
36 Gap
38 Guide nose
40 Air-conducting geometry
42 Rotor legs
44 Interspace

What is claimed is:

1. A cooling-fluid-conducting device for an electric machine, comprising:

multiple liquid cooling-fluid lines which project radially outward from a center axis of the cooling-fluid-conducting device on a common circular surface, wherein each of the liquid cooling-fluid lines has an inlet opening which is configured to be arranged in a manner aligned with an assigned bore of a rotor shaft, whereby a liquid cooling fluid is flowable into a respective liquid cooling-fluid line from the rotor shaft via the inlet opening, and each of the liquid cooling-fluid lines has at least two outlet openings, a first of which is configured to be axially spaced from and arranged facing toward a rotor of the electric machine, a second of which is configured to be axially spaced from and arranged facing toward a stator of the electric machine, and via which the liquid cooling fluid is flowable out of the respective liquid cooling-fluid line from the cooling-fluid-conducting device toward the rotor and toward the stator.

2. The cooling-fluid-conducting device according to claim 1, wherein respective inner ends of the liquid cooling-fluid lines are connected to one another via an inner ring and/or respective outer ends of the liquid cooling-fluid lines are connected to one another via an outer ring.

3. The cooling-fluid-conducting device according to claim 1, wherein the liquid cooling-fluid lines have, at an outer side, an air-conducting geometry configured to conduct air to the rotor and/or to the stator.

4. The cooling-fluid-conducting device according to claim 3, wherein the air-conducting geometry is configured to have a blade form.

5. The cooling-fluid-conducting device according to claim 1, wherein the at least one outlet opening includes a nozzle.

6. The cooling-fluid-conducting device according to claim 1, wherein the second outlet opening assigned to the stator is delimited radially toward the center axis by a guide nose configured to guide cooling fluid flowing out via said second outlet opening.

7. An electric machine, comprising:

a hollow rotor shaft;

a rotor which is held in a rotationally conjoint manner on the rotor shaft;

a stator, relative to which the rotor is rotatable about a center axis, and a cooling-fluid-conducting device held in a rotationally conjoint manner on the rotor shaft axially spaced from and arranged facing toward the rotor and the stator, the cooling-fluid-conducting device comprising:

multiple liquid cooling-fluid lines which project radially outward from the center axis of the cooling-fluid-conducting device on a common circular surface, wherein each of the liquid cooling-fluid lines has an inlet opening which is configured to be arranged in a manner aligned with an assigned bore of the rotor shaft, whereby a liquid cooling fluid is flowable into a respective liquid cooling-fluid line from the rotor shaft via the inlet opening, and each of the liquid cooling-fluid lines has at least two outlet openings, a first of which is configured to be axially spaced from and arranged facing toward the rotor, a second of which is configured to be axially spaced from and arranged facing toward the stator, and via which the liquid cooling fluid is flowable out of the respective liquid cooling-fluid line from the cooling-fluid-conducting device toward the rotor and toward the stator.

8. The electric machine according to claim 7, wherein the hollow rotor shaft has, for each of the liquid cooling-fluid lines, the bore which is arranged so as to be aligned with the inlet opening of the respective assigned liquid cooling-fluid line.

9. The electric machine according to claim 8, wherein at least one of the liquid cooling-fluid lines has the second outlet opening aligned with an interspace between two adjacent legs of the rotor.

10. A method for providing an electric machine, comprising:

fastening a cooling-fluid-conducting device in a rotationally conjoint manner to a hollow rotor shaft axially spaced from and arranged facing toward a rotor and a stator of the electric machine, the cooling-fluid-conducting device comprising:

multiple liquid cooling-fluid lines which project radially outward from a center axis of the cooling-fluid-conducting device on a common circular surface, wherein each of the liquid cooling-fluid lines has an inlet opening which is configured to be arranged in a manner aligned with an assigned bore of the rotor shaft, whereby a liquid cooling fluid is flowable into a respective liquid cooling-fluid line from the rotor shaft via the inlet opening, and each of the liquid cooling-fluid lines has at least two outlet openings, a first of which is configured to be axially spaced from and arranged facing toward the rotor, a second of which is configured to be axially spaced from and arranged facing toward the stator, and via which the liquid cooling fluid is flowable out of the respective liquid cooling-fluid line from the cooling-fluid-conducting device toward the rotor and toward the stator;

rotating the rotor shaft about the center axis by the rotor; and balancing the rotor shaft by way of removal of material and/or application of material at the cooling-fluid-conducting device.

* * * * *